March 4, 1924. Re. 15,788
F. B. WALDRON
APPARATUS FOR GRINDING OR POLISHING PLATE GLASS
Original Filed Aug. 5, 1920
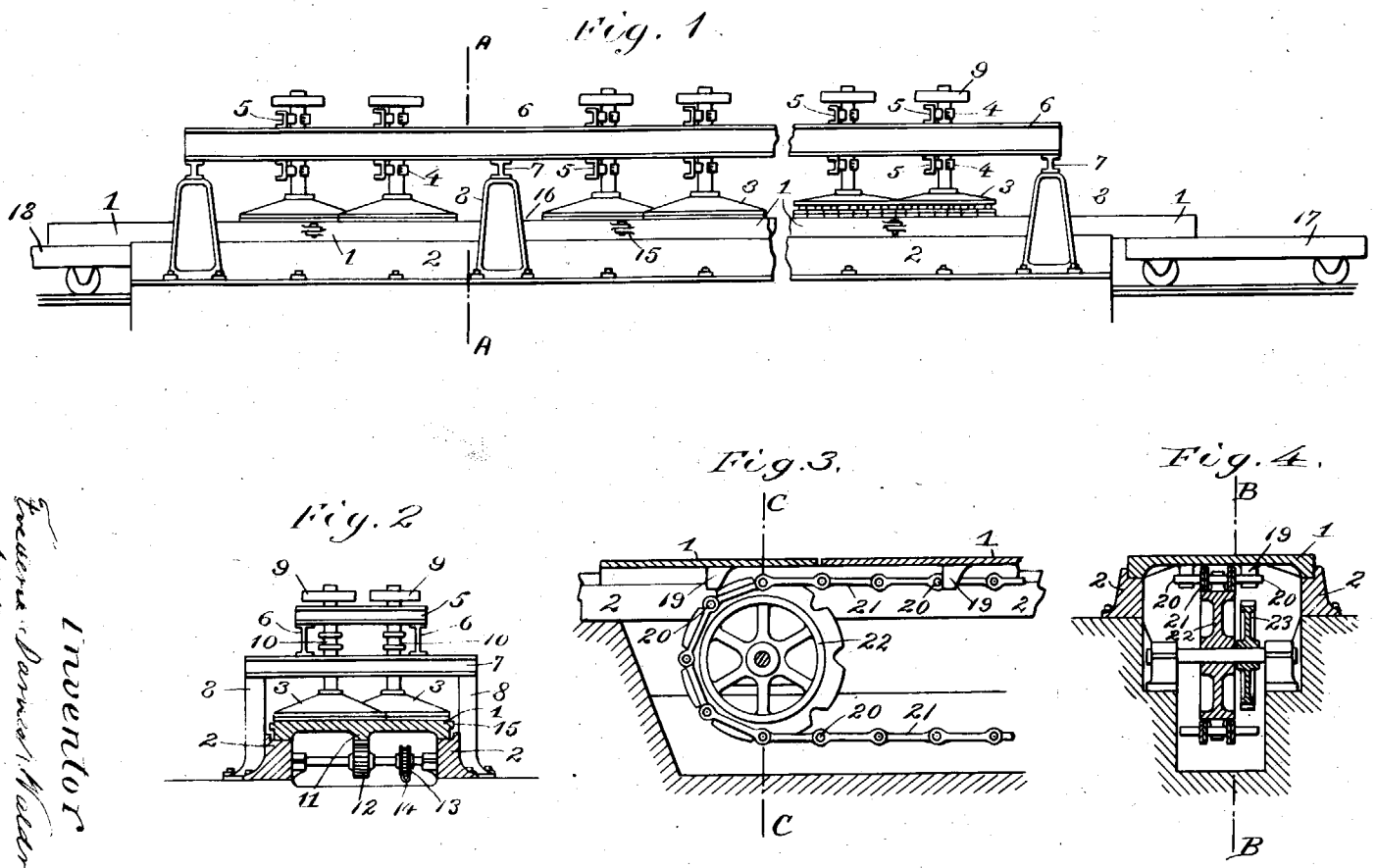
Inventor
Frederick Barnard Waldron
by Rogers, Kennedy & Campbell
Attys Reissued Mar. 4, 1924.

Re. 15,788

UNITED STATES PATENT OFFICE.

FREDERIC BARNES WALDRON, OF PRESCOT, ENGLAND, ASSIGNOR TO PILKINGTON BROTHERS LIMITED, OF ST. HELENS, ENGLAND, A LIMITED LIABILITY COMPANY OF GREAT BRITAIN.

APPARATUS FOR GRINDING OR POLISHING PLATE GLASS.

Original No. 1,370,246, dated March 1, 1921, Serial No. 401,488, filed August 5, 1920. Application for reissue filed March 27, 1923. Serial No. 628,114.

*To all whom it may concern:*

Be it known that I, FREDERIC BARNES WALDRON, a subject of the King of the United Kingdom of Great Britain and Ireland, and residing at Eccleston Park, Prescot, in the county of Lancaster, England, have invented new and useful Improvements in Apparatus for Grinding or Polishing Plate Glass, of which the following is a specification.

This invention relates to apparatus for grinding or polishing plate glass and has for its object to provide apparatus wherein labor, power and abrasive can be utilized more efficiently than has heretofore been possible with apparatus of other construction.

In early forms of grinding and polishing apparatus, the glass was laid on a rectangular table, and reciprocating rubbers, fed with abrasive, were pressed on the glass and acted to grind, smooth and polish it, either the rubbers or the table being given a movement at right angles to the reciprocating movement so that the whole surface of the glass was uniformly acted on.

It was found that higher powers and speeds could be employed in the operations of grinding, smoothing and polishing, by adopting a rotary in place of a reciprocating motion, and glass is now commonly ground, smoothed and polished by attaching plates of rough glass to the surface of a large circular table which is revolved under two or more disk runners, while abrasive is supplied to the surface of the glass. The surface of the circular table is covered as far as possible by rectangular plates of glass of commercially useful sizes and then the spaces left have to be filled up by pieces of glass which are too small to be commercially useful, but serve the purpose of presenting a uniform surface on which the runners can rub. The grinding is begun with coarse sand and when this stage of the grinding is complete, the grinding is stopped and the sand is washed off and a finer grade of sand is supplied, the process being afterward repeated with further different grades of sand. The final stages of grinding, sometimes called smoothing, are then effected in a similar manner and on the same apparatus, by employing different grades of emery in place of sand. Where the table is driven by an electric motor, the speed of revolution of the table and the power applied, are varied for each grade of abrasive so as to effect the grinding and smoothing in the minimum time. When one side of the glass has been ground, the table is removed from the grinding apparatus and brought to a polishing apparatus, and when the polishing has been completed, the table is again removed, the plates of glass turned over and re-laid on the table and the table is brought to the grinding apparatus and the process repeated.

The present invention among other features, combines the advantages of the rectangular form of table employed in the early forms of apparatus with the rotary motion employed in the later forms.

The whole process of grinding or polishing a side of glass is continuous and does not involve the aforementioned interruption of operation for change of abrasive, since the apparatus, without stoppage, permits of the effective removal of each grade of abrasive before the glass reaches that stage at which it is operated on by the next finer grade.

In the accompanying drawings, which are shown more or less diagrammatically—

Figure 1 is a side elevation of one form of the apparatus, a portion thereof being omitted, Fig. 2 is a section thereof on the line A. A. looking from the left hand;

Fig. 3 is a longitudinal section on the line B. B. of Fig. 4 of a portion of the apparatus showing an alternative method of driving the tables, and Fig. 4 is a transverse section of the same on the line C. C. of Fig. 3.

Referring to Figs. 1 and 2, 1, 1 are the tables on which the plates of glass are laid, 2, 2 is a bed-plate serving to support and guide the tables. The runners 3, 3, turn in bearings 4, 4, attached to cross girders 5, 5, fixed on two longitudinal girders 6, 6, which are supported on cross girders 7, 7, resting on supports 8, 8. The runners are turned by any convenient mechanism such as the pulleys 9, 9, and are raised and lowered and their pressure on the glass regulated, by any of the methods commonly employed, such as the collars 10, 10, in which counterbalanced levers (not shown) engage.

Centrally of the width of the tables, a rack 11 is fixed to the underside of the said tables, and a pinion 12 gears with the rack 11 and is driven by any convenient mechanism such as a worm wheel 13 and worm 14, said driving means being repeated as often as may be convenient along the length of the apparatus.

The tables 1, 1 are connected together by any convenient device such as pairs of overlapping lugs 15, through which cotters are driven. The tables under the runners 3 then form a continuous surface and, by means of the rack 11 and pinion 12, they are slowly passed under the runners in the example illustrated from the left hand of the drawings toward the right.

The runners are shown arranged in sets of two, the two runners of each set having their axes one on each side of the centre line so that together they operate over the whole width of the tables. Either a single large runner, however, or such a group of runners as may be required to insure uniform grinding over the width of the table, may be employed, and will be denoted hereinafter by the term "set of runners."

Each set of runners is supplied with one grade of abrasive but where it is desired that the glass should be subjected to the action of one grade of abrasive for a longer time than that appertaining to the other grades of abrasive, two or more sets of runners may be supplied with this one grade of abrasive. In this way all the runners may be constantly operated at full power and speed without stoppage. It is generally desirable to let down the first set of runners on to the rough glass with gradually increasing pressure, but apart from this all the runners can operate continuously with a constant pressure.

A space 16 is left between each set of runners, and the glass in its passage across this space, is washed clear of the abrasive employed with the immediately following set of runners where the preceding set employs a different grade of abrasive. By this means different grades of abrasive can be used simultaneously throughout the machine and the process of grinding or polishing the glass, as distinguished from the customary process, is rendered continuous. The space between the sets of runners using different grades of abrasive must be sufficient to avoid abrasive thrown out by a runner under centrifugal force reaching the preceding or following runner.

The last set of runners shown at the right hand end of Fig. 1 is a set of polishing runners, and, though it is sometimes stated that the rouge commonly employed for polishing glass, does not act as an abrasive and that the action of the runners is not a grinding action, yet in this specification the terms "abrasive" and "grinding" are taken to include the rouge or other medium used in polishing and the action of polishing respectively.

When a table has passed under the whole series of sets of runners and has come to the right hand end of the apparatus, the glass is removed and the table then passed on to a trolley 17 and that table is then detached from the following tables and removed on the trolley, another trolley being placed to receive the next following table. The trolley is then brought to the left hand or starting end of the apparatus, so as to bring the end of the table against the end of the first table on the apparatus as shown at 18. The table is then attached to the first table on the apparatus, glass is laid thereon and the table then again passes under the whole series of runners 3.

The invention is not confined to the use of the trolleys shown, as any other convenient means of transportation may be employed, and instead of a rack and pinion the means employed to drive the tables may be an endless chain engaging lugs on the tables.

It is essential to the practical working of the apparatus that the series of tables in passing from one end of the apparatus to the other, present a practically continuous unbroken surface, without any difference of level between one end of a table and the adjacent end of the next table, so that the grinding and polishing runners may, at all points, operate on a practically continuous and level surface of glass. For this reason it is an essential feature of the invention that the tables be in sliding contact with the bed-plate 2, 2, the contacting surfaces both of the tables and bed-plate being accurately machined to a plane.

Figs. 3 and 4 show an alternative method of driving the tables 1, 1, in which the latter are not attached together to form a continuous table, but follow each other so closely as to form a nearly continuous table. The drawings show only the supporting bed-plate 2, 2, without the overhead framework and runners, since these do not differ from those shown in Figs. 1 and 2.

Each table is provided with a pair of lugs 19, 19, with which engage projections 20, 20, on an endless chain 21 running below the tables along the whole length of the apparatus.

The chain 21 is driven by one or both of a pair of chain wheels of which one is shown at 22, the drive being by any convenient means such as the gear wheel 23.

In this form of the apparatus, a table, after passing under the series of runners, is automatically freed from the projections on the chain by reason of the chain descending to pass over the chain wheel, and, in order to engage a table with the chain at the starting end of the apparatus, it is sufficient to keep the table (the left hand table 1 in Fig. 3) pressed against the then first table on the apparatus, at the moment that one of the projections 20 on the chain is rising to engage the lug 19 on the table.

This apparatus, by reason of each grinding runner being able to work continuously at its full power and speed without stoppage, is always working at maximum efficiency, while the usual skilled labor for constantly varying the pressure of the runners is not required. Further, it permits of each grade of abrasive being easily recovered and re-graded, and, since only the glass has to be washed clear of the abrasive it permits of a more easy and thorough removal of the coarser abrasive than has heretofore been practicable.

The rectangular shape of the tables avoids the necessity for filling the segmental spaces, as is necessary with the usual circular table, with small pieces of glass which are useless commercially and require power for grinding and labor in laying, and, further, as the glass is not subjected to centrifugal force it is more easy to attach it to the table. At the same time, the advantages of the rotary motion of the circular tables are secured by the rotary disk runners and enables high powers and speeds to be employed.

The device, therefore, combines the advantages of the rectangular tables with those of the rotary tables.

The disk runners may be of any desired kind and size and arranged in any suitable manner relatively to the tables and each other, and each may be driven by an independent motor, or a series of runners can be driven by belt or gearing from a single motor or countershaft, the speeds being such as to rotate each set of runners at the speed best suited to the adbrasive used with it.

I am aware that it has heretofore been proposed to construct a so-called continuous glass grinding and polishing machine in which the tables for feeding the glass beneath the grinding and polishing runners are mounted on wheels adapted to travel on tracks, and in which the glass is cut to a size or sizes completely to cover each table. In such a construction, due to the support of the tables on wheels, the great pressure exerted by the runners in their operation on the glass causes a relative motion of the adjacent ends of the tables which would inevitably fracture the glass plates if laid over the joints between the tables. My machine is to be distinguished from such a construction in that the tables are slidingly supported on fixed guides where there can be no relative motion of the adjacent ends of tables and, consequently, in laying the glass on the tables, the joints can be ignored and the glass be laid over such joints, the tables forming in effect a continuous support for the glass.

Having described my invention, I declare that what I claim and desire to secure by Letters Patent is:—

1. Apparatus for grinding or polishing plate glass consisting of a series of rectangular tables in contact each with its neighbors forming a continuous support for the plates of glass and slidingly supported on fixed guides, a framework above the series of tables, a series of sets of runners on vertical shafts, bearings for the shafts attached to the framework, means for moving the series of tables continuously from one end to the other of the series of sets of runners, means for removing a table from the moving series of tables after it has left the last set of runners, and means for adding a table to the moving series of tables before the first set of runners, the sets of runners being so spaced apart as to permit of the effective washing away of the abrasive between any two sets using different grades.

2. Apparatus for grinding or polishing plate glass consisting of a series of rectangular tables in contact each with its neighbors forming a continuous support for the plates of glass and slidingly supported on fixed guides, a framework above the said series of tables, a series of sets of runners on vertical shafts, bearings for the shafts attached to the framework, a rack attached to the underside of each table and a gear wheel engaging the rack to move the series of tables at uniform speed from one end to the other of the series of sets of runners.

In testimony whereof I have affixed my signature hereto.

FREDERIC BARNES WALDRON.